United States Patent
Malladi et al.

(10) Patent No.: US 7,613,144 B2
(45) Date of Patent: Nov. 3, 2009

(54) SYSTEMS AND METHODS FOR MULTIPLEXING CONTROL DATA FOR MULTIPLE DATA CHANNELS ONTO A SINGLE CONTROL CHANNEL

(75) Inventors: Durga Prasad Malladi, San Diego, CA (US); Serge D. Willenegger, Onnens (CH); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 760 days.

(21) Appl. No.: 10/952,265

(22) Filed: Sep. 27, 2004

(65) Prior Publication Data

US 2005/0169211 A1 Aug. 4, 2005

Related U.S. Application Data

(60) Provisional application No. 60/508,537, filed on Oct. 2, 2003.

(51) Int. Cl.
| | |
|---|---|
| *H04J 3/08* | (2006.01) |
| *H04J 3/00* | (2006.01) |
| *H04Q 7/00* | (2006.01) |
| *H04B 7/212* | (2006.01) |

(52) U.S. Cl. ............... 370/328; 370/336; 370/337; 370/347; 370/329; 370/341

(58) Field of Classification Search ............... 455/561, 455/450, 451, 452.1, 422.1, 403, 464, 466, 455/509, 515–517, 550.1, 556.2, 59.61, 414.4, 455/452.2, 424–425, 434; 370/310, 313–314, 370/328–330, 335–338, 340–345, 347–350, 370/441–442, 458, 461, 538–543, 913–916, 370/326–327, 389, 391, 436, 471, 474, 477, 370/535, 211, 537, 235, 265, 321, 393–394, 370/521–522, 300–302, 236, 294, 295, 336, 370/339, 341, 349

See application file for complete search history.

(56) References Cited

U.S. PATENT DOCUMENTS 5,440,542 A 8/1995 Procter et al.

(Continued)

FOREIGN PATENT DOCUMENTS

EP 1248485 9/2002

(Continued)

OTHER PUBLICATIONS

!Dahlman E., et al , "WCDMA-The Radio Interface for Future Mobile Multimedia Communications", IEEE Transactions on Vehicular Technology, Nov. 1998 pp. 1105-1118 .

(Continued)

*Primary Examiner*—Meless N Zewdu
(74) *Attorney, Agent, or Firm*—Roberta A. Young; Jeffrey D. Jacobs; Thomas R. Rouse

(57) ABSTRACT

Systems and methods for communicating control data for multiple data channels using a single control channel. In one embodiment, a method is implemented in a WCDMA communications system. This method includes combining data rate information for a first data channel and data rate information for a second data channel in a mobile station, encoding the combined data rate information and transmitting the encoded combined data rate information from the mobile station to a base station via a single control channel. This method further includes receiving the encoded combined data rate information in the base station, decoding the encoded combined data rate information to produce the combined data rate information, and extracting the data rate information for the first and second data channels and decoding the first and second data channels using this information.

54 Claims, 6 Drawing Sheets

U.S. PATENT DOCUMENTS

| | | | |
|---|---|---|---|
| 5,859,840 | A | 1/1999 | Tiedemann, Jr. et al. |
| 5,991,285 | A | 11/1999 | Ghosh |
| 6,266,321 | B1 | 7/2001 | Pehkonen et al. |
| 6,341,125 | B1 | 1/2002 | Hong et al. |
| 6,522,638 | B1* | 2/2003 | Haugli et al. ............... 370/329 |
| 6,707,859 | B1 | 3/2004 | Kinnunen et al. |
| 6,747,963 | B1 | 6/2004 | Park et al. |
| 6,813,506 | B1 | 11/2004 | Song |
| 6,816,507 | B1 | 11/2004 | Jarbot et al. |
| 6,868,075 | B1 | 3/2005 | Narvinger et al. |
| 6,987,778 | B2 | 1/2006 | Sindhushayana et al. |
| 8,985,471 | | 1/2006 | Holma at al |
| 7,054,381 | B2* | 5/2006 | Lim et al. .................. 375/295 |
| 7,088,697 | B1* | 8/2006 | Benz et al. ................. 370/335 |
| 7,088,700 | B2 | 8/2006 | Lee et al. |
| 7,180,874 | B2 | 2/2007 | Ma et al. |
| 7,200,126 | B2 | 4/2007 | Lim |
| 7,324,565 | B2 | 1/2008 | Malkamaki |
| 7,177,345 | B2 | 3/2008 | KIM |
| 2002/0141436 | A1 | 10/2002 | Toskala |
| 2002/0154610 | A1 | 10/2002 | Tiedemann, Jr. et al. |
| 2003/0012309 | A1* | 1/2003 | Kajita et al. ................ 375/341 |
| 2003/0072290 | A1* | 4/2003 | Hwang et al. ............... 370/342 |
| 2003/0103473 | A1 | 6/2003 | Warich et al. |
| 2003/0210712 | A1* | 11/2003 | Cai et al. .................... 370/498 |
| 2004/0100918 | A1 | 5/2004 | Toskala et al. |

FOREIGN PATENT DOCUMENTS

| | | |
|---|---|---|
| WO | 0005829 | 3/2000 |
| WO | 03015310 | 2/2003 |

OTHER PUBLICATIONS

"Universal Mobile Telecommunications System (UMTS): Physical Channels and Mapping of transport Channels onto Physical Channels (FDD)". ETSI TS 125 211 V3.1.1., Nov. 2, 2002 pp. 1-38.

International Search Report-PCT/US04/032394, International Search Authority European Patent Office, Dec. 29, 2004.

* cited by examiner

SYSTEMS AND METHODS FOR MULTIPLEXING CONTROL DATA FOR MULTIPLE DATA CHANNELS ONTO A SINGLE CONTROL CHANNEL

CLAIM OF PRIORITY UNDER 35 U.S.C. §119

The present Application for Patent claims priority to Provisional Application No. 60/508,537 entitled "Flexible multiplexing of Control Channel" filed Oct. 2, 2003, and assigned to the assignee hereof and hereby expressly incorporated by reference herein.

REFERENCE TO CO-PENDING APPLICATIONS FOR PATENT

"Systems and Method for Multiplexing Control Information Onto a Physical Data Channel" having Ser. No. US 2005/0163071 A1, filed concurrently herewith, assigned to the assignee hereof, and expressly incorporated by reference herein; and "Systems and Method for Communication Control Data Using Multiple Slot Formats" having Ser. No. US 2005/0163065 A1, filed concurrently herewith, assigned to the assignee hereof, and expressly incorporated by reference herein.

FIELD OF INVENTION

The present invention relates generally to communication systems and more particularly to systems and methods for providing control information for multiple data channels by combining the control information and transmitting the combined information on a single control channel.

BACKGROUND OF THE INVENTION

A wireless telecommunications system may be used to enable information to be communicated between a mobile device and a base station, between a mobile device and an information server, between mobile devices, and so on. The information communicated between the various devices may include audio (e.g., voice) information, high speed data, control information and various other types of data.

One exemplary telecommunications system includes a base station controller, one or more base stations and one or more mobile stations. Each of the base stations is coupled to the base station controller by a network that is normally referred to as the backhaul network. The backhaul network typically comprises physical communication links between the base station controller and the base stations. Each of the mobile stations is coupled to one of the base stations. The communication links between the mobile stations and the base stations comprise wireless links.

The wireless communication link between each mobile station and the base station with which it communicates includes a set of channels for communicating data from the base station to the mobile station, as well as a set of channels for communicating data from the mobile station to the base station. The first set of channels (from base station to mobile station) are referred to as the forward link. The second set of channels (from mobile station to base station) are referred to as the reverse link.

The channels of both the forward link and reverse link are configured to carry various types of information. For example, some of the channels carry data, while others carry control information. In one embodiment, the reverse link includes a primary dedicated data channel and a corresponding dedicated control channel. The control channel is configured to carry information necessary to decode the primary dedicated data channel, such as an indication of the data rate at which data is transmitted on the data channel.

It may be desirable to add another data channel to this system. Just as with the primary dedicated data channel, it will be necessary to transmit control information for the additional data channel in order to enable the base station to decode the data that is transmitted on the additional data channel. Conventionally this control information would be transmitted on an additional control channel corresponding to the additional data channel. This solution, however, is disadvantageous in that it requires the use of resources (e.g., additional processing, additional spreading codes, etc.) to support the additional control channel. It would therefore be desirable to provide improved systems and methods for communicating the necessary control information for the additional data channel.

SUMMARY

Embodiments disclosed herein address the above stated needs by using a single control channel to transmit control information for multiple data channels. One embodiment comprises a method implemented in a W-CDMA communications system. This method includes combining data rate information for a first data channel and data rate information for a second data channel in a mobile station, encoding the combined data rate information and transmitting the encoded combined data rate information from the mobile station to a base station via a single control channel. This method further includes receiving the encoded combined data rate information in the base station, decoding the encoded combined data rate information to produce the combined data rate information, and extracting the data rate information for the first and second data channels and decoding the first and second data channels using this information.

An alternative embodiment comprises a method implemented in a mobile station for a wireless communication system. This method includes combining data rate information for a first data channel and data rate information for a second data channel in a mobile station, encoding the combined data rate information and transmitting the encoded combined data rate information from the mobile station to a base station via a single control channel.

Another alternative embodiment comprises a method implemented in a base station for a wireless communication system. This method includes receiving the encoded combined data rate information in the base station, decoding the encoded combined data rate information to produce the combined data rate information, and extracting the data rate information for the first and second data channels and decoding the first and second data channels using this information.

Another alternative embodiment comprises a mobile station including a transceiver subsystem and a processing subsystem coupled to the transceiver subsystem, where the processing subsystem is configured to combine data rate information for a first data channel and data rate information for a second data channel, encode the combined data rate information, and transmit the encoded combined data rate information via a single control channel.

Another alternative embodiment comprises a base station including a transceiver subsystem and a processing subsystem coupled to the transceiver subsystem, where the processing subsystem is configured to receive encoded combined data rate information via a single control channel, decode the encoded combined data rate information to produce combined data rate information and extract data rate information for a first data channel and data rate information for a second data channel from the combined data rate information.

Another alternative embodiment comprises a wireless communication system including a mobile station and a base station. The mobile station is configured to combine data rate information for a first data channel and data rate information for a second data channel, encode the combined data rate information, and transmit the encoded combined data rate information via a single control channel. The base station is configured to receive the encoded combined data rate information via the single control channel, decode the encoded combined data rate information to produce the combined data rate information, and extract the data rate information for the first data channel and the data rate information for the second data channel from the combined data rate information.

Numerous additional alternative embodiments are also possible.

BRIEF DESCRIPTION OF THE DRAWINGS

Various aspects and features of the invention are disclosed by the following detailed description and the references to the accompanying drawings, wherein.

Figure 1:
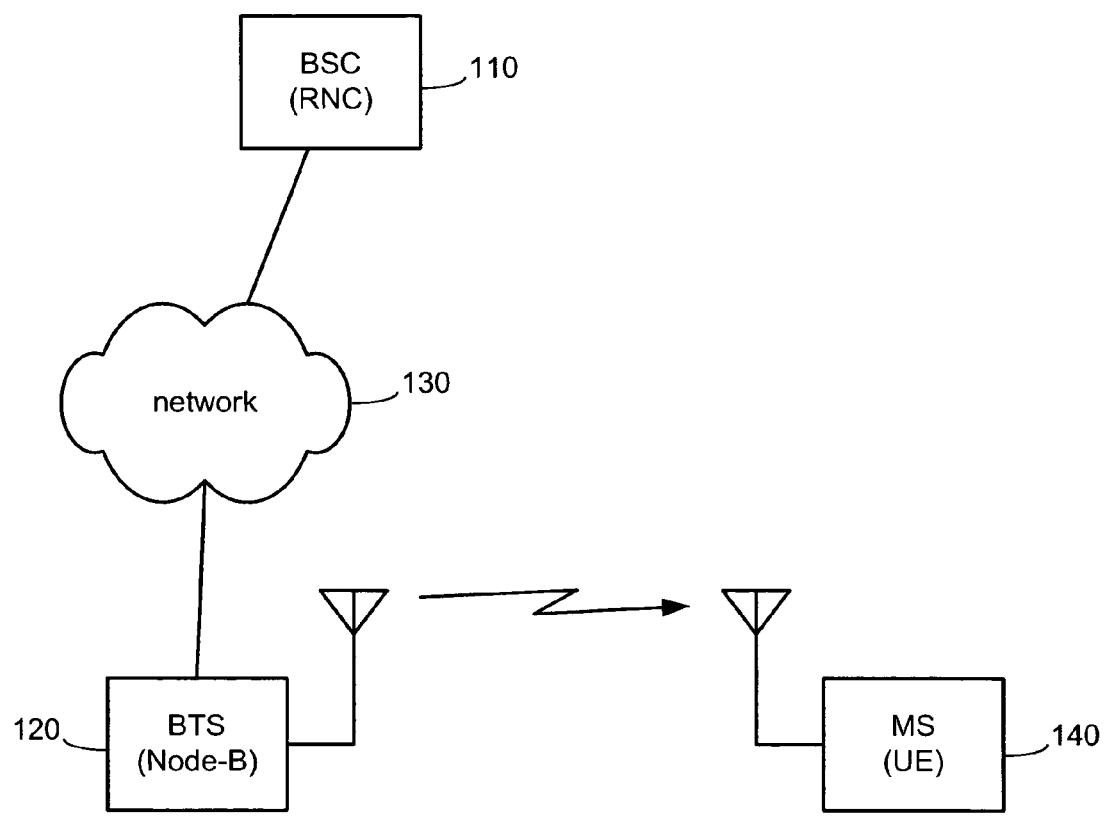
FIG. 1 is a diagram illustrating the high-level structure of a wireless telecommunications system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiments which are described.

DETAILED DESCRIPTION

One or more embodiments of the invention are described below. It should be noted that these and any other embodiments described below are exemplary and are intended to be illustrative of the invention rather than limiting.

As described herein, various embodiments of the invention comprise systems and methods for communicating control data for multiple data channels using a single control channel. In one embodiment, a method is implemented in a W-CDMA communications system. This method includes combining data rate information for a first data channel and data rate information for a second data channel in a mobile station, encoding the combined data rate information and transmitting the encoded combined data rate information from the mobile station to a base station via a single control channel. This method further includes receiving the encoded combined data rate information in the base station, decoding the encoded combined data rate information to produce the combined data rate information, and extracting the data rate information for the first and second data channels and decoding the first and second data channels using this information.

One embodiment of the invention is implemented in a wireless telecommunications system that is designed in accordance with a W-CDMA (wideband code division multiple access) standard. It will therefore be helpful to describe the basic structure and operation of such a system in order to aid in the understanding of the invention. It should be noted that, while the following description focuses primarily upon a system that follows this standard, alternative embodiments may be implemented in systems that follow other standards as well.

Referring to FIG. 1, a diagram illustrating the structure of a wireless telecommunications system in accordance with one embodiment is shown. System 100 includes a base station controller 110, a base station 120 that is coupled to base station controller 110 through a backhaul network 130, and a mobile station 140. System 100 may include additional base stations and mobile stations which, for purposes of clarity, are not shown in the figure.

The terminology used to refer to the components of the system may differ from one embodiment to another. For example, base station controller 110 may be referred to as a radio network controller (RNC), base station 120 may be referred to as a "Node-B," and mobile station 140 may be referred to as user equipment (UE). Because the various embodiments of the invention may be implemented in different types of wireless communication systems (e.g., systems designed according to different standards or different releases of the same standard,) references to the different components of the systems should be interpreted broadly, and references to particular components using terminology applicable to a particular type of system should not be construed to imply that the embodiments of the invention are limited to that particular type of system.

It should also be noted that, while the description herein of this and other embodiments focuses on a system in which a mobile station may move with respect to a base station, other embodiments may be implemented in systems that enable wireless communication between alternative types of devices. It is not necessary that one of the devices be a "base station," nor is it necessary that the other of the devices be "mobile." References herein to mobile stations and base stations should therefore be construed to include any wireless transceiver devices that are in communication with each other.

While, in practice, the specific designs of base station 120 and mobile station 140 may vary significantly, each serves as a wireless transceiver for communicating over the forward and reverse links. Base station 120 and mobile station 140 therefore have the same general structure. This structure is illustrated in FIG. 2.

Figure 2:
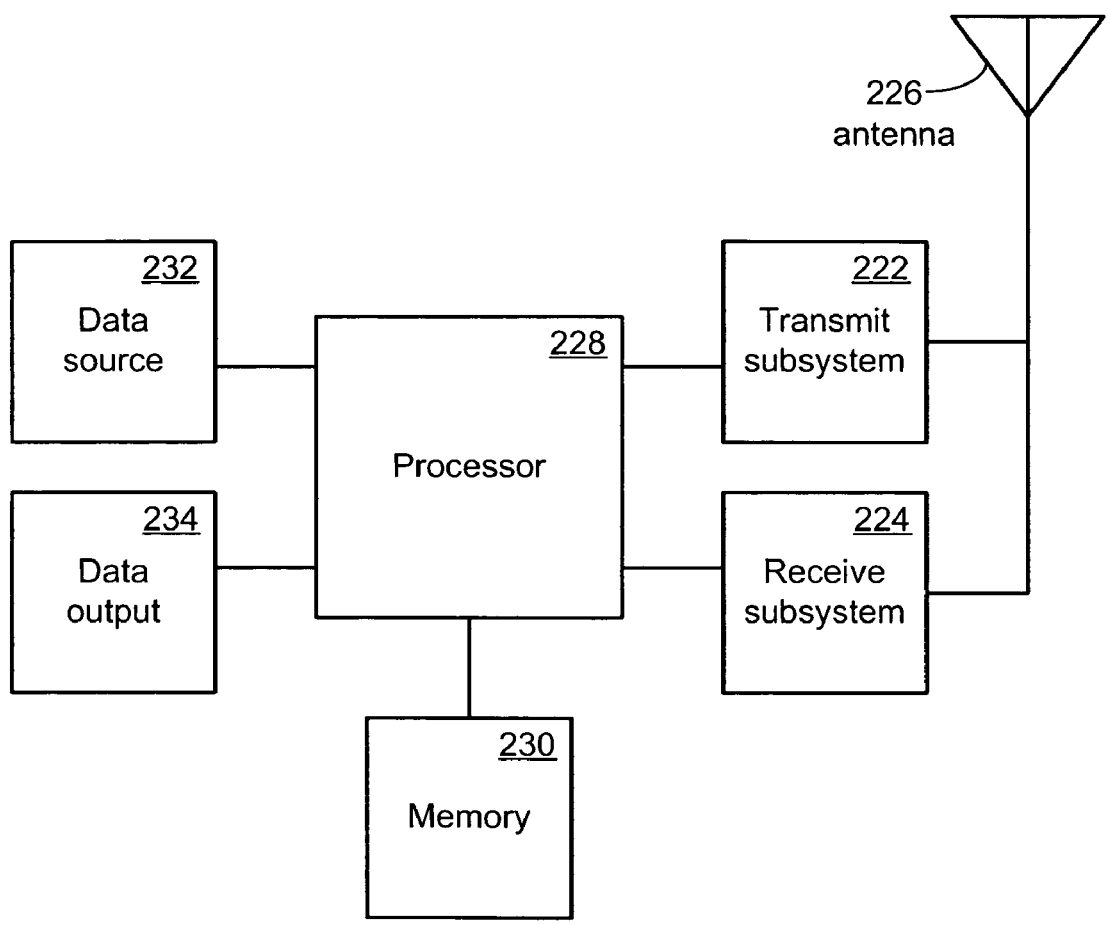
FIG. 2 is a functional block diagram illustrating the basic structural components of a wireless transceiver system in accordance with one embodiment.

Referring to FIG. 2, a functional block diagram illustrating the basic structural components of a wireless transceiver system in accordance with one embodiment is shown. As depicted in this figure, the system comprises a transmit subsystem 222 and a receive subsystem 224, each of which is coupled to an antenna 226. Transmit subsystem 222 and receive subsystem 224 may be collectively referred to as a transceiver subsystem. Transmit subsystem 222 and receive subsystem 224 access the forward and/or reverse link through antenna 226.

Transmit subsystem 222 and receive subsystem 224 are also coupled to processor 228, which is configured to control transmit and receive subsystems 222 and 224. Memory 230 is coupled to processor 228 to provide working space and local storage for the processor. Processor 228 and memory 230 may be collectively referred to as a processing subsystem. A data source 232 is coupled to processor 228 to provide data for transmission by the system. Data source 232 may, for example, comprise a microphone or an input from a network device. The data is processed by processor 228 and then forwarded to transmit subsystem 222, which transmits the data via antenna 226. Data received by receive subsystem 224 through antenna 226 is forwarded to processor 228 for processing and then to data output 234 for presentation to a user. Data output 234 may comprise such devices as a speaker, a visual display, or an output to a network device.

Persons of skill in the art of the invention will appreciate that the structure depicted in FIG. 2 is illustrative and that other embodiments may use alternative configurations. For example, processor 228, which may be a general-purpose microprocessor, a digital signal processor (DSP) or a special-purpose processor, may perform some or all of the functions of other components of the transceiver, or any other processing required by the transceiver. The scope of the claims set forth below are therefore not limited to the particular configurations described herein.

Mobile station 140 typically is not stationary (although, in some instances, it may be.) Mobile station 140 is instead likely to move with respect to base station 120. The changing position of mobile station 140 typically causes the channel conditions for the wireless link between mobile station 140 and base station 120 to vary. The channel conditions may also be affected by other factors, such as atmospheric conditions, movement of other objects between mobile station 140 and base station 120, interference from other transmitters, and so on.

Because of the changes in the channel conditions for the wireless communication link, there may be changes in the data rate at which mobile station 140 transmits data to base station 120. These changes in the data rates used by mobile station 140 to transmit the data are necessary to provide a high enough signal-to-noise ratio, SNR, (or signal-to-interference-and-noise ratio, SINR,) that base station 120 will receive the data with an acceptable error rate. The better the channel conditions, the higher the data rate that can be used by the mobile station. The worse the channel conditions, the lower the data rate that must be used by the mobile station.

The data rate and corresponding data format for one or more channels may, in some embodiments, be referred to as a transport format (TF) or transport format combination (TFC). For purposes of clarity, individual transport formats as well as transport format combinations may be referred to below simply as data rates.

In one embodiment, the mobile station of the wireless telecommunications system is configured to transmit information to the base station on three channels. The first of these channels is a dedicated data channel. This data channel may carry various types of data, including such high priority data as voice data, streaming video or the like, and lower priority data, the delivery of which is not delay-sensitive. This dedicated data channel may be referred to herein as the primary data channel. The second of the channels is a control channel. The control channel carries control information that is needed by the base station in order to properly decode the data transmitted on the primary data channel. This control information may, for example, include pilot channel information, power control information and data rate information. These different types of information may also be characterized as different logical channels within the physical control channel.

The primary data channel and the control channel are found in conventional WCDMA systems. Typically, for each frame that is transmitted on the primary data channel, there is a corresponding frame that is transmitted on the control channel. The information contained in the frame of the control channel is received by the base station, decoded, and then used to decode the information in the data channel frame. The control channel frame may be transmitted synchronously with the corresponding data channel frame, or it may be transmitted prior to transmission of the corresponding data channel frame.

In the present embodiment, in addition to the primary data channel and the control channel, a third channel (an enhanced dedicated data channel) is transmitted from the mobile station to the base station. The enhanced data channel is used in this embodiment to transmit data for high-speed, non-delay-sensitive services. In alternative embodiments, other types of data may be transmitted. While it is necessary to transmit control information for the enhanced data channel to the base station so that the base station can decode the data received via the enhanced data channel, this control information is not transmitted in a control channel that is separate from the control channel described above. Instead, the control information for the enhanced data channel is combined with the control information for the primary data channel, and the combined control information is transmitted from the mobile station to the base station on the one control channel. The manner in which this is accomplished is described in detail below.

Figure 3:
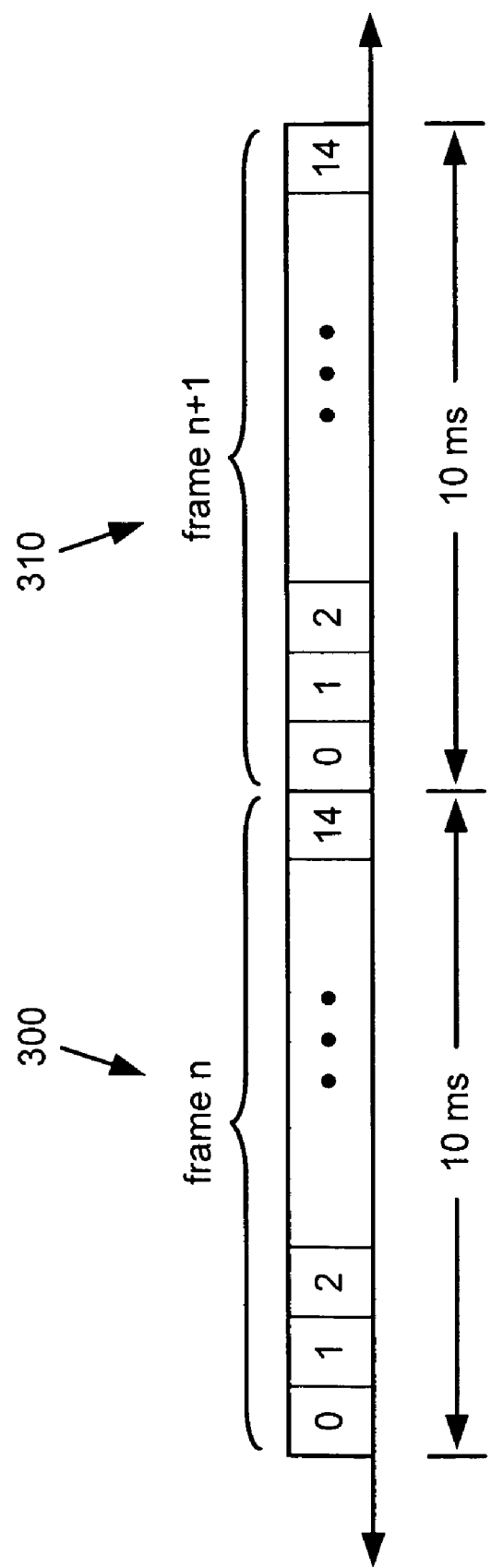
FIG. 3 is a diagram illustrating the structure of frames of data transmitted on a pair of data channels and a control channel in accordance with one embodiment.

In the present embodiment, all three of the channels (the primary dedicated data channel, the dedicated control channel and the enhanced dedicated data channel) use the same frame format. This format is illustrated in FIG. 3. FIG. 3 shows two frames, 300 and 310. As shown in this figure, each frame spans ten milliseconds. Each frame is further broken down into 15 slots.

Figure 4:
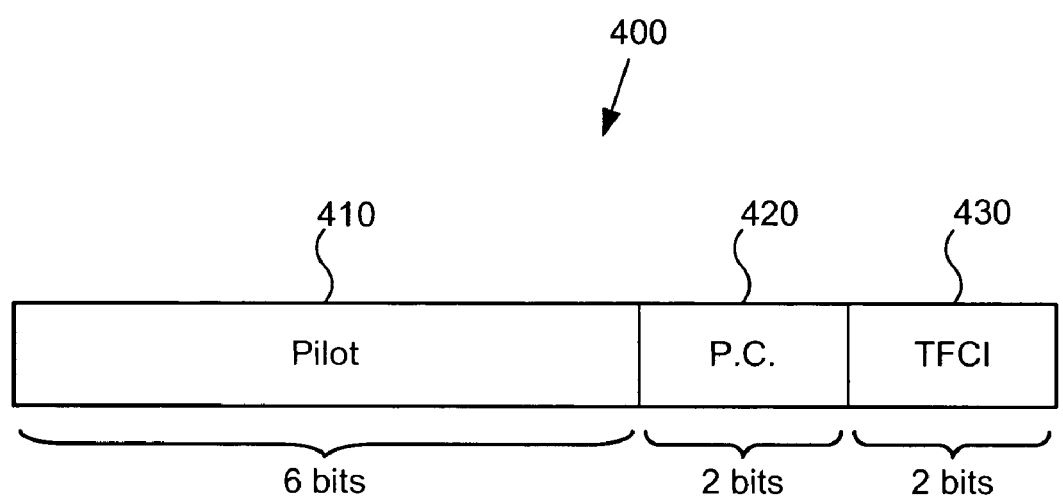
FIG. 4 is a diagram illustrating the structure of the control information within each slot of a control frame in accordance with one embodiment.

As mentioned above, the control channel is used in this embodiment to transmit control information including pilot data, power control data and data rate information. Referring to FIG. 4, a diagram illustrating the structure of this information within each slot is shown. FIG. 4 depicts a single slot 400. Contained within slot 400 is pilot data 410, power control data 420 and data rate information 430. Slot 400 consists of ten data bits. Six of these ten bits are used to convey pilot data 410, while two bits are used as power control data 420 and two bits are used for data rate information 430. The data rate information is shown in the figure as the TFCI, or transport format combination indicator.

While TFCI information 430 comprises only two bits of each slot, more than two bits are available to communicate the TFCI value for each frame. This is because the selected transport formats used by the mobile station to transmit data on the primary and enhanced data channels are updated on a frame by frame basis. In other words, while each data channel can select a different transport format for each succeeding frame, the transport format remains unchanged during the frame. Thus, all of the 30 TFCI bits in the frame (two bits times fifteen slots,) rather than only the two TFCI bits in a single slot, are available to communicate the selected TFCI value.

While 30 of the bits transmitted in a frame are dedicated to transmitting TFCI information from the mobile station to the base station, less than 30 bits of actual transport format information are communicated. This is because the transport format information is encoded before being transmitted. The encoding process, which is intended to increase the reliability with which the data is communicated, increases the number of bits that need to be transmitted. This process will be described briefly below.

Figure 5:
FIG. 5 is a flow diagram illustrating the process through which data rate information is encoded in accordance with one embodiment.

Referring to FIG. 5, a flow diagram illustrating the process through which data rate information is encoded in accordance with one embodiment is shown. In this figure, data rate information (TFCI) is encoded (block 510.) In this case, the encoder implements a ⅓ encoding scheme. The encoding consists of covering the original data rate information with spreading codes in a manner which is well known to persons of skill in the field of WCDMA communications. The encoding of the original data rate information, which consists of ten data bits, results in 32 bits of encoded rate information data. Because the control data format described above in connection with FIG. 4 makes available only 30 bits for data rate information, some form of rate matching must be performed (block 520.) In one embodiment, the rate matching function may simply consist of "puncturing" the encoded data, or dropping the last two bits.

Thus, 30 bits of encoded data rate information are generated from the ten bits of the original data rate information. These 30 bits of encoded data rate information can then be transmitted from the mobile station to the base station by transmitting the first two bits in the first slot of the frame, the next two bits in the second slot of the frame, and so on, until all 30 bits have been transmitted.

In a conventional system, all ten bits of the original data rate information are available for use in conveying the data rate used by the primary dedicated data channel. Typically, however, ten bits are not required to identify the data rate for the primary data channel. It is normally the case that there are a relatively small number of possible data rates for this data channel. For instance, there may only be four, eight, or 16 possible data rates from which the actual data rate for the primary dedicated channel may be selected. If there are only four possible data rates, only two bits are necessary to identify which of the four ($2^2$) possible data rates has been selected. Similarly, if there are only eight ($2^3$) or 16 ($2^4$) possible data rates, only three or four bits, respectively, are necessary to identify the selected rate. Consequently, in these examples, six to eight bits of the ten bits that are available to convey data rate information are unused.

In the present embodiment, the bits that are not used to identify the data rate for the primary data channel are instead used to identify the data rate of the enhanced data channel. In the above example in which four bits are used to convey the data rate of the primary data channel, six of the ten bits are available for use in identifying the data rate of the enhanced data channel. These six bits can serve to identify which data rate is selected from among 64 ($2^6$) possible rates.

In the present embodiment, a mobile station therefore selects appropriate data rates for the primary and enhanced data channels, combines data rate indicators corresponding to these values in the ten available bits, and then processes the ten bits in the same manner as if these bits contained only the data rate information for the primary data channel. When a frame of control data is received by the base station, this information is decoded and the data rate information corresponding to each of the primary and enhanced data channels is extracted and used in the decoding of the corresponding data channels.

Figure 6:
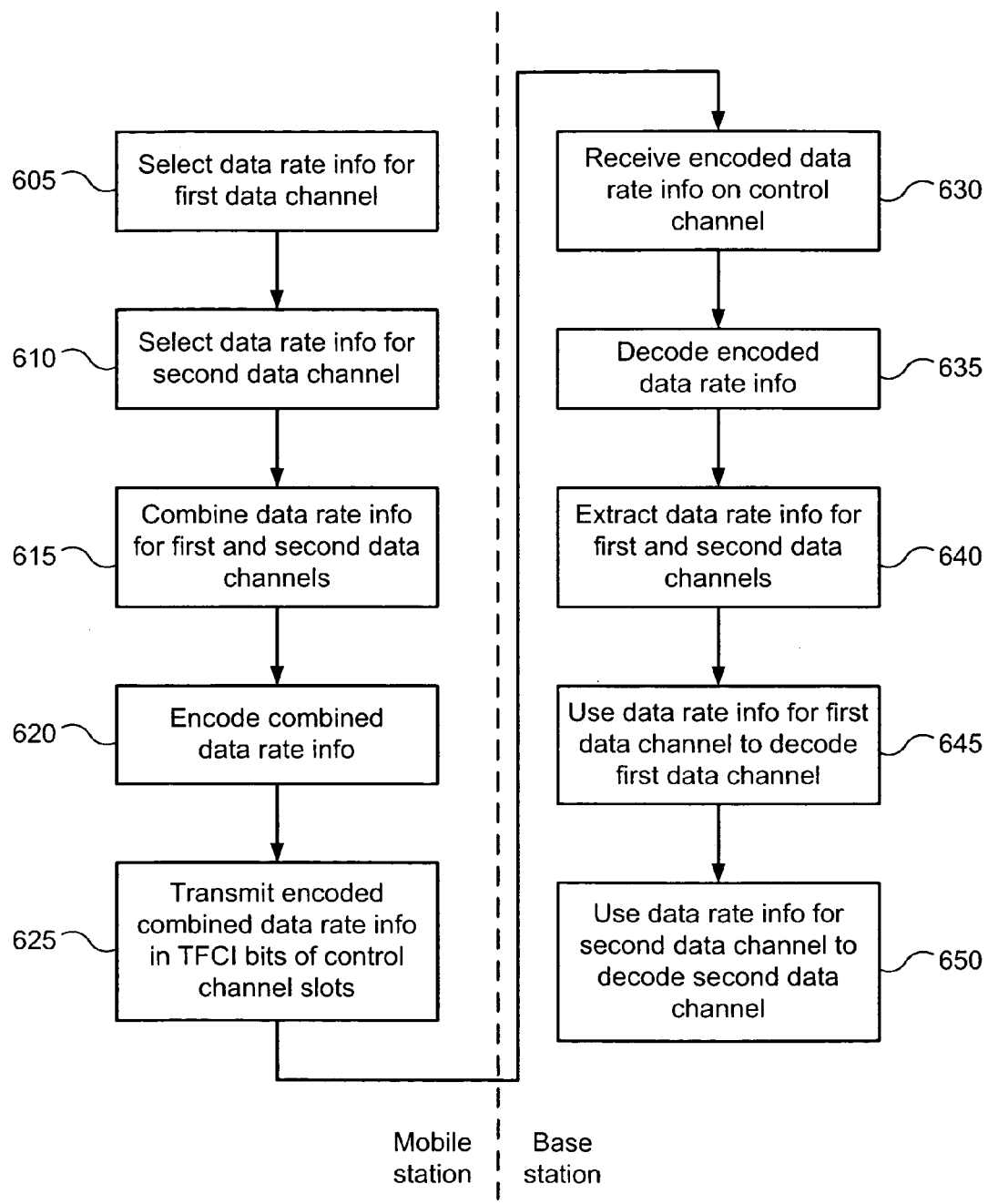
FIG. 6 is a flow diagram illustrating the process of communicating control information for two data channels over a single control channel in accordance with one embodiment.

The methodology employed in the present embodiment is illustrated in FIG. 6. FIG. 6 is a flow diagram illustrating the process of communicating control information for two data channels over a single control channel. The method depicted in the figure includes a first portion on the left side of the figure and a second portion on the right side of the figure. The first portion corresponds generally to the portion of the method that is performed by a mobile station. The second portion corresponds generally to the portion of the method that is performed by a base station. It should be noted that, in addition to the entire method depicted in the figure, the first and second portions of the method may, in themselves, be considered alternative embodiments.

As shown in FIG. 6, the method begins with selection of data rate information for the first, primary dedicated data channel (block 605,) as well as selection of data rate information for the second, enhanced dedicated data channel (block 610.) The data rate selection for each of the data channels may be performed in any suitable manner, such as those methods that are known in the wireless telecommunications art. When a data rate for each channel has been selected, a corresponding data rate indicator is also selected. As noted above, if a data rate is selected from among $2^n$ possible data rates, the selected rate can be represented by an n-bit value.

The data rate information (e.g., data rate indicators) for the two data channels is then combined (block 615.) In one embodiment, the two data rate indicators are combined simply by appending one to the other. Thus, if the data rate indicator for the first data channel consists of a four-bit value and the data rate indicator for the second data channel consists of a six-bit value, the first four of the ten data rate bits may contain the first data rate indicator, while the last six of the ten data rate bits may contain the second data rate indicator. In alternative embodiments, the data rate indicators for the two data channels may be combined (multiplexed) in a different manner.

After the data rate information for the two data channels is combined, the combined information is encoded (block 620.) In one embodiment, the ten bits of combined data rate information are encoded in the same manner that the ten bits of data rate information for the primary data channel is conventionally encoded. In the embodiment described above, the encoding consists of covering the data bits with spreading codes (e.g., using a ⅓ encoding scheme) and then rate matching (e.g., puncturing) the data to generate the number of bits (e.g., 30) that can be transmitted in the control frame.

The encoded data rate information is then transmitted in a frame on the control channel (block 625.) In the embodiment described above, this consists of transmitting two bits of the encoded data rate information in each slot of the control frame. Thus, the first two bits of the encoded data rate information are transmitted in slot 0, the next two bits are transmitted in slot 1, and so on.

After the frame of control data is transmitted by the mobile station, it is communicated to and received by the base station via the dedicated control channel (block 630.) The received frame of control information is then decoded (block 635.) In one embodiment, the decoding of the control information is performed in the same manner as if only control data for the first data channel were included. In other embodiments, the decoding of the control information may be performed in other ways.

When the control data has been decoded, the ten bits of control information are available to the base station. The base station therefore extracts the data rate information for each of the first and second data channels (block 640.) If the mobile station combined to the data rate indicators by simply appending one to the other, the base station extracts the indicators by parsing the ten bits into the respective data rate indicators for the first and second data channels. If the mobile station multiplexed the data rate indicators in a more complex manner, a corresponding demultiplexing method is used by the base station to extract the indicators.

After the data rate indicators for the first and second data channels have been extracted from the control information, the base station uses these data rate indicators to determine the data rates at which the first and second data channels are transmitted and then the codes the first data channel and the second data channel using the respective data rate information (blocks 645, 650.)

It should be noted that numerous variations may be made in the embodiments described above without departing from the scope of the invention as detailed in the claims below. For instance, while the foregoing embodiments involve the combining of data rate information for two data channels on a single control channel, it may be possible in other embodiments to combine the data rate information for more than two data channels. It may also be possible to combine the data rate information for n data channels in m control channels, where n is greater than m. In another embodiment, information other than data rate information (e.g., frame formatting information) for the different data channels may be combined on one or more control channels.

In another variation, the bits that are available for transmitting data rate information may be allocated to the different data channels in a different manner than described above. For example, rather than allocating four bits to one channel and six bits to another, the allocation may be two/eight bits, three/seven bits, five/five bits, etc. It is also possible to use alternative frame and/or slot formats that make more or less than ten bits available for transmitting data rate information. The allocation of the bits between the different data rate indicators may be varied from time to time using higher layer signaling.

Although not discussed in detail above, it should be noted that the functionality described above may be implemented in the mobile stations and base stations described above by providing suitable programs that are executed in the respective processing subsystems of these devices. These program instructions are typically embodied in a storage medium that is readable by the respective processing subsystems. Exemplary storage media may include RAM memory, flash memory, ROM memory, EPROM memory, EEPROM memory, registers, hard disk, a removable disk, a CD-ROM, or any other form of storage media known in the art. Such a storage medium embodying program instructions for implementing the functionality described above comprises an alternative embodiment of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and method steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It should also be noted that the illustrative components, blocks, modules, circuits, and steps may be reordered or otherwise reconfigured in alternative embodiments. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method implemented in a mobile station of a wireless communication system, the method comprising:
   combining data rate information for a first data channel and data rate information for a second data channel;
   encoding the combined data rate information;
   transmitting the encoded combined data rate information via a single control channel;
   transmitting a first frame of data on the first data channel at a first data rate, the first frame of data is decoded at a receiver using the data rate information for the first data channel; and
   transmitting a second frame of data on the second data channel at a second data rate, the second frame of data is decoded at the receiver using the data rate information for the second channel.

2. The method of claim 1, further comprising selecting a first data rate for the first data channel and selecting a second data rate for the second data channel.

3. The method of claim 2, wherein the data rate information for the first data channel comprises a first data rate indicator corresponding to the first data rate and the data rate information for the second data channel comprises a second data rate indicator corresponding to the second data rate.

4. The method of claim 3, wherein combining the data rate information for the first data channel and the data rate information for the second data channel comprises multiplexing the first and second data rate indicators into a set of data rate bits.

5. The method of claim 4, wherein multiplexing the first and second data rate indicators into the set of data rate bits comprises appending one of the data rate indicators onto the other of the data rate indicators.

6. The method of claim 4, wherein encoding the combined data rate information comprises covering the combined data rate information with spreading codes.

7. The method of claim 1, wherein the combined data rate information comprises ten bits and the encoded combined data rate information comprises 30 bits.

8. The method of claim 7, wherein the encoded combined data rate information is transmitted on the control channel in a 10 millisecond frame.

9. The method of claim 8, wherein two of the 30 bits of the encoded combined data rate information are transmitted in each of 15 slots within the frame.

10. A method implemented in a base station of a wireless communication system, the method comprising:
   receiving encoded combined data rate information via a single control channel;
   receiving a first frame of data on a first data channel at a first data rate;
   receiving a second frame of data on a second data channel at a second data rate;
   decoding the encoded combined data rate information to produce combined data rate information;
   extracting data rate information for the first data channel and data rate information for the second data channel from the combined data rate information;
   decoding the first frame of data using the data rate information for the first data channel; and
   decoding the second frame of data using the data rate information for the second data channel.

11. The method of claim 10, wherein the combined data rate information comprises a set of data rate bits and wherein extracting the data rate information for the first data channel and the data rate information for the second data channel from the combined data rate information comprises dividing the set of data rate bits into a first data rate indicator and a second data rate indicator.

12. The method of claim 10, wherein the combined data rate information comprises ten bits.

13. The method of claim 10, wherein bits of the encoded combined data rate information are received in each of a plurality of slots of a received frame.

14. A method implemented in a wireless communication system, the method comprising:
   combining data rate information for a first data channel and data rate information for a second data channel;
   encoding the combined data rate information;
   transmitting the encoded combined data rate information via a single control channel;
   receiving the encoded combined data rate information via the single control channel;
   decoding the encoded combined data rate information to produce the combined data rate information;
   extracting the data rate information for the first data channel and the data rate information for the second data channel from the combined data rate information;
   transmitting a first frame of data on the first data channel at the first data rate and transmitting a second frame of data on the second data channel at the second data rate;
   receiving the first frame of data on the first data channel and the second frame of data on the second data channel; and
   decoding the first frame of data using the data rate information for the first data channel and decoding the second frame of data using the data rate information for the second data channel.

15. A mobile station for a wireless communication system comprising:
   a transceiver subsystem that transmits a first frame of data on a first data channel at a first data rate and a second frame of data on a second data channel at a second data rate; and
   a processing subsystem coupled to the transceiver subsystem and configured to combine data rate information for the first data channel and data rate information for the second data channel, encode the combined data rate information, and transmit the encoded combined data rate information via a single control channel, the first frame of data is decoded at a receiver using the data rate information for the first data channel, and the second frame of data is decoded at a receiver using the data rate information for the second data channel.

16. The mobile station of claim 15, wherein the processing subsystem is further configured to select a first data rate for the first data channel and select a second data rate for the second data channel.

17. The mobile station of claim 16, wherein the data rate information for the first data channel comprises a first data rate indicator corresponding to the first data rate and the data rate information for the second data channel comprises a second data rate indicator corresponding to the second data rate.

18. The mobile station of claim 17, wherein the processing subsystem is configured to combine the data rate information for the first data channel and the data rate information for the second data channel by multiplexing the first and second data rate indicators into a set of data rate bits.

19. The mobile station of claim 18, wherein the processing subsystem is configured to multiplex the first and second data rate indicators into the set of data rate bits by appending one of the data rate indicators onto the other of the data rate indicators.

20. The mobile station of claim 18, wherein the processing subsystem is configured to encode the combined data rate information by covering the combined data rate information with spreading codes.

21. The mobile station of claim 15, wherein the combined data rate information comprises ten bits and the encoded combined data rate information comprises 30 bits.

22. The mobile station of claim 21, wherein the processing subsystem is configured to transmit the encoded combined data rate information on the control channel in a 10 millisecond frame.

23. The mobile station of claim 22, wherein the processing subsystem is configured to transmit two of the 30 bits of the encoded combined data rate information in each of 15 slots within the frame.

24. A base station for a wireless communication system comprising:
   a transceiver subsystem that receives a first frame of data on a first data channel at a first data rate and a second frame of data on a second data channel at a second data rate; and
   a processing subsystem coupled to the transceiver subsystem and configured to receive encoded combined data rate information via a single control channel, decode the encoded combined data rate information to produce combined data rate information, and extract data rate information for the first data channel and data rate information for the second data channel from the combined data rate information, the processing subsystem decodes the first frame of data using the data rate information for the first data channel and decodes the second frame of data using the data rate information for the second data channel.

25. The base station of claim 24, wherein the combined data rate information comprises a set of data rate bits and wherein the processing subsystem is configured to extract the data rate information for the first data channel and the data rate information for the second data channel from the combined data rate information by dividing the set of data rate bits into a first data rate indicator and a second data rate indicator.

26. The base station of claim 24, wherein the combined data rate information comprises ten bits.

27. The base station of claim 24, wherein the processing subsystem is configured to
receive bits of the encoded combined data rate information in each of a plurality of slots of a received frame.

28. A wireless communication system comprising:
a mobile station configured to;
combine first data rate information for a first data channel and second data rate information for a second data channel;
encode the combined data rate information;
transmit the encoded combined data rate information via a single control channel;
transmit a first frame of data on the first data channel at the first data rate; and
transmit a second frame of data on the second data channel at the second data rate; and
a base station configured to;
receive the encoded combined data rate information via the single control channel;
decode the encoded combined data rate information to produce the combined data rate information; and
extract the data rate information for the first data channel and the data rate information for the second data channel from the combined data rate information;
receive the first frame of data on the first data channel;
receive the second frame of data on the second data channel;
decode the first frame of data using the data rate information for the first data channel; and
decode the second frame of data using the data rate information for the second data channel.

29. A mobile station for a wireless communication system comprising:
means for combining data rate information for a first data channel and data rate information for a second data channel;
means for encoding the combined data rate information;
means for transmitting the encoded combined data rate information via a single control channel;
means for transmitting a first frame of data on the first data channel at a first data rate, the first frame of data is decoded at a receiver using the data rate information for the first data channel; and
means for transmitting a second frame of data on the second data channel at a second data rate, the second frame of data is decoded at the receiver using the data rate information for the second channel.

30. The mobile station of claim 29, further comprising means for selecting a first data rate for the first data channel and selecting a second data rate for the second data channel.

31. The mobile station of claim 30, wherein the data rate information for the first data channel comprises a first data rate indicator corresponding to the first data rate and the data rate information for the second data channel comprises a second data rate indicator corresponding to the second data rate.

32. The mobile station of claim 31, wherein the means for combining the data rate information for the first data channel and the data rate information for the second data channel comprises means for multiplexing the first and second data rate indicators into a set of data rate bits.

33. The mobile station of claim 32, wherein the means for multiplexing the first and second data rate indicators into the set of data rate bits comprises means for appending one of the data rate indicators onto the other of the data rate indicators.

34. The mobile station of claim 32, wherein the means for encoding the combined data rate information comprises means for covering the combined data rate information with spreading codes.

35. The mobile station of claim 29, wherein the combined data rate information comprises ten bits and the encoded combined data rate information comprises 30 bits.

36. The mobile station of claim 35, wherein the encoded combined data rate information is transmitted on the control channel in a 10 millisecond frame.

37. The mobile station of claim 36, wherein two of the 30 bits of the encoded combined data rate information are transmitted in each of 15 slots within the frame.

38. A base station for a wireless communication system comprising:
means for receiving encoded combined data rate information via a single control channel;
means for receiving a first frame of data on a first data channel at a first data rate;
means for receiving a second frame of data on a second data channel at a second data rate;
means for decoding the encoded combined data rate information to produce combined data rate information; and
means for extracting data rate information for the first data channel and data rate information for the second data channel from the combined data rate information;
means for decoding the first frame of data using the data rate information for the first data channel; and
means for decoding the second frame of data using the data rate information for the second data channel.

39. The base station of claim 38, wherein the combined data rate information comprises a set of data rate bits and wherein the means for extracting the data rate information for the first data channel and the data rate information for the second data channel from the combined data rate information comprises means for dividing the set of data rate bits into a first data rate indicator and a second data rate indicator.

40. The base station of claim 38, wherein the combined data rate information comprises ten bits.

41. The base station of claim 38, wherein bits of the encoded combined data rate information are received in each of a plurality of slots of a received frame.

42. A computer computer-readable medium comprising:
a first code for causing a computer to combine data rate information for a first data channel and data rate information for a second data channel;
means for encoding the combined data rate information;
a second code for causing the computer to transmit the encoded combined data rate information via a single control channel;
a third code for causing the computer to transmit a first frame of data on the first data channel at a first data rate, the first frame of data is decoded at a receiver using the data rate information for the first data channel; and
a fourth code for causing the computer to transmit a second frame of data on the second data channel at a second data rate, the second frame of data is decoded at the receiver using the data rate information for the second channel.

43. The computer computer-readable medium of claim 42, further comprising code for causing a computer to select a first data rate for the first data channel and selecting a second data rate for the second data channel.

44. The computer computer-readable medium of claim 43, wherein the data rate information for the first data channel comprises a first data rate indicator corresponding to the first data rate and the data rate information for the second data channel comprises a second data rate indicator corresponding to the second data rate.

45. The computer computer-readable medium of claim 44, wherein the code for causing a computer to combine the data rate information for the first data channel and the data rate information for the second data channel comprises code for causing a computer to multiplex the first and second data rate indicators into a set of data rate bits.

46. The computer computer-readable medium of claim 45, wherein the code for causing a computer to multiplex the first and second data rate indicators into the set of data rate bits comprises code for causing a computer to append one of the data rate indicators onto the other of the data rate indicators.

47. The computer computer-readable medium of claim 45, wherein the code for causing a computer to encode the combined data rate information comprises code for causing a computer to cover the combined data rate information with spreading codes.

48. The computer computer-readable medium of claim 42, wherein the combined data rate information comprises ten bits and the encoded combined data rate information comprises 30 bits.

49. The computer computer-readable medium of claim 48, wherein the encoded combined data rate information is transmitted on the control channel in a 10 millisecond frame.

50. The computer computer-readable medium of claim 49, wherein two of the 30 bits of the encoded combined data rate information are transmitted in each of 15 slots within the frame.

51. A base station for a wireless communication system comprising:
    means for receiving encoded combined data rate information via a single control channel;
    means for receiving a first frame of data on a first data channel at a first data rate;
    means for receiving a second frame of data on a second data channel at a second data rate;
    means for decoding the encoded combined data rate information to produce combined data rate information; and
    means for extracting data rate information for the first data channel and data rate information for the second data channel from the combined data rate information;
    means for decoding the first frame of data using the data rate information for the first data channel; and
    means for decoding the second frame of data using the data rate information for the second data channel.

52. The computer-readable medium base station of claim 51, wherein the combined data rate information comprises a set of data rate bits and wherein the means for extracting the data rate information for the first data channel and the data rate information for the second data channel from the combined data rate information comprises means for dividing the set of data rate bits into a first data rate indicator and a second data rate indicator.

53. The computer-readable medium base station of claim 51, wherein the combined data rate information comprises ten bits.

54. The base station of claim 51, wherein bits of the encoded combined data rate information are received in each of a plurality of slots of a received frame.

\* \* \* \* \*

UNITED STATES PATENT AND TRADEMARK OFFICE
CERTIFICATE OF CORRECTION

PATENT NO. : 7,613,144 B2
APPLICATION NO. : 10/952265
DATED : November 3, 2009
INVENTOR(S) : Malladi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Fourteenth Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,613,144 B2 | Page 1 of 1 |
| APPLICATION NO. | : 10/952265 | |
| DATED | : November 3, 2009 | |
| INVENTOR(S) | : Malladi et al. | |

It is certified that error appears in the above-identified patent and that said Letters Patent is hereby corrected as shown below:

Column 14, line 48, claim 42: delete "computer"

Column 14, line 64, claim 43: delete "computer"

Column 15, line 1, claim 44: delete "computer"

Column 15, line 7, claim 45: delete "computer"

Column 15, line 13, claim 46: delete "computer"

Column 15, line 18, claim 47: delete "computer"

Signed and Sealed this

Thirty-first Day of May, 2011

David J. Kappos
*Director of the United States Patent and Trademark Office*